July 24, 1951     E. K. UHLE     2,561,433
INSERTS FOR ARTICLES OF PLASTIC
AND SIMILAR MATERIALS
Filed Feb. 14, 1946     2 Sheets-Sheet 1
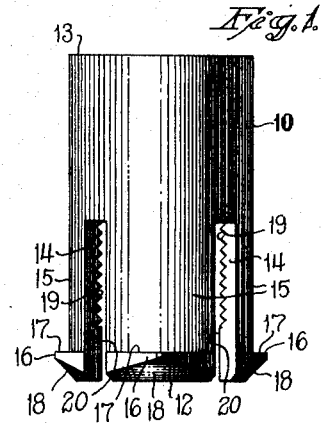
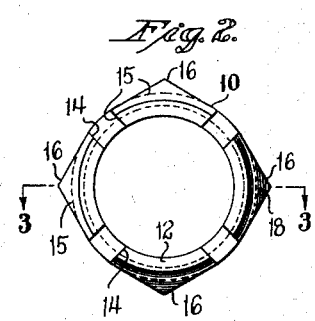
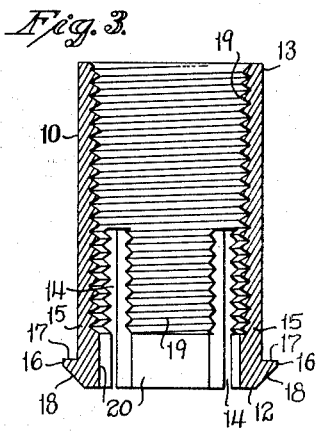
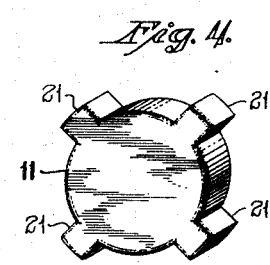
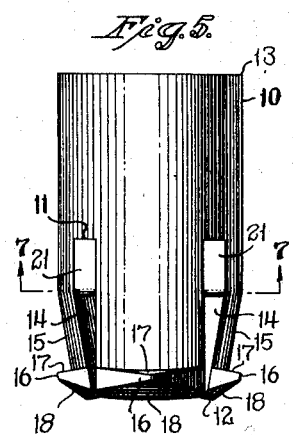
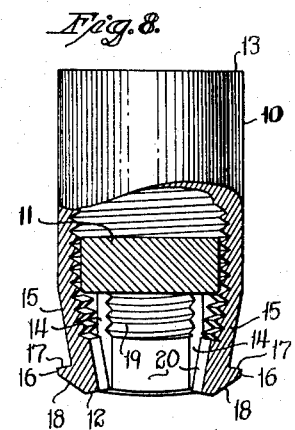
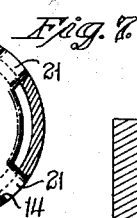
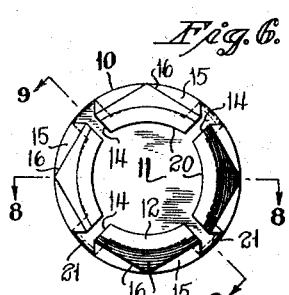
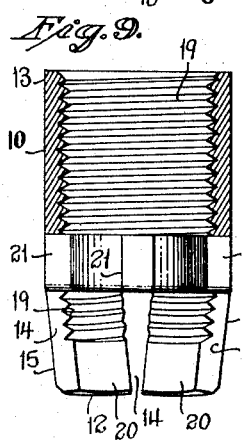
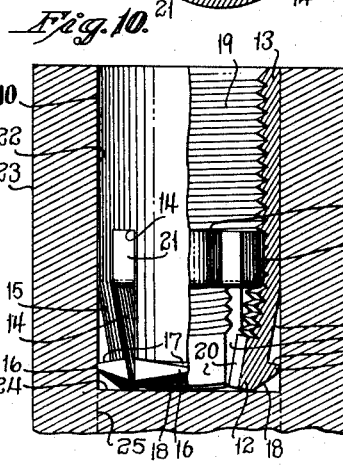
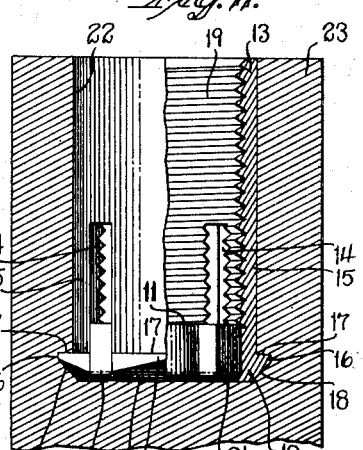
Inventor
Emil K. Uhle
by Seymour Earle & Nichols
Attorneys

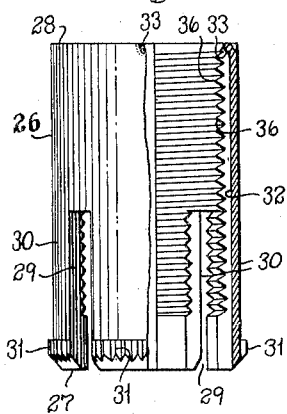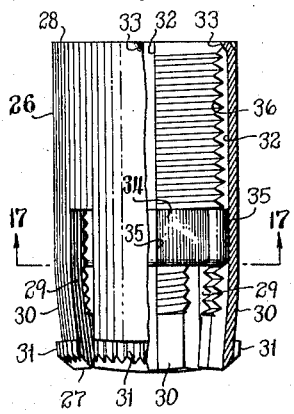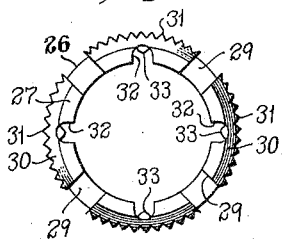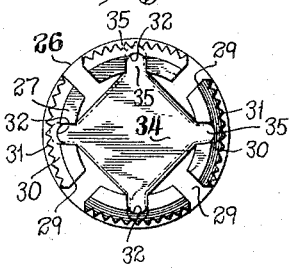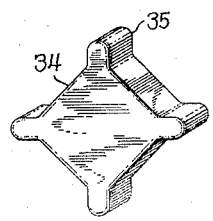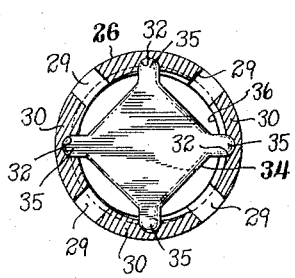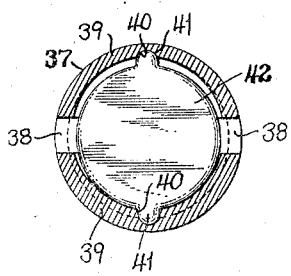

Patented July 24, 1951

2,561,433

UNITED STATES PATENT OFFICE 2,561,433

INSERTS FOR ARTICLES OF PLASTIC AND SIMILAR MATERIALS

Emil K. Uhle, Naugatuck, Conn., assignor, by direct and mesne assignments, to The Phelps Manufacturing Company, Middlebury, Conn., a corporation of Connecticut Application February 14, 1946, Serial No. 647,493

5 Claims. (Cl. 85—2.4)

1

The present invention relates to improvements in inserts which are adapted for insertion into and self-retention in preformed recesses or passages in articles composed of synthetic resin or other materials having the property of being suitably deformable.

One of the objects of the present invention is to provide a superior insert of the character referred to which is economical to produce and convenient of use.

Another object of the present invention is to provide a novel insert which may be firmly locked in a preformed recess as an incident to force applied in a direction axially of the insert.

A further object of the present invention is to provide a superior insert of the character referred to which may be firmly locked in a recess in an article without requiring such a high degree of deformation of the article as to rupture the same.

Still another object of the present invention is to provide a novel tubular insert having internal threads and outwardly-deflectable locking-arms, together with means for outwardly deflecting the said locking-arms with minimum injury to such threads.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in side elevation of one form of body-member shown in its condition prior to the permanent assembly with it of an expanding-member;

Fig. 2 is a bottom plan of the inner end of the body-member of Fig. 1;

Fig. 3 is a central-longitudinal sectional elevation taken on the line 3—3 of Fig. 2;

Fig. 4 is a perspective view of the expanding-member, detached;

Fig. 5 is a view in side elevation of the assembly comprising the body-member and the expanding-member with the locking-arms of the said body-member deflected inwardly;

Fig. 6 is a bottom plan of the inner end of the assembly of Fig. 5;

Fig. 7 is a transverse sectional view taken on the line 7—7 of Fig. 5;

Fig. 8 is a side elevation of the assembly partly in longitudinal section taken on the line 8—8 of Fig. 6;

Fig. 9 is an elevation in section on the line 9—9 of Fig. 6;

Fig. 10 is a side elevation of the assembled insert partly in longitudinal section and shown as installed in a recess, preparatory to being locked therein;

Fig. 11 is a view similar to Fig. 10 but showing the locking-arms moved outwardly by the inward movement of the expanding-member to lock the assembly in the recess;

Fig. 12 is an elevation partly in central-longitudinal section of another form of body-member, suitable for use in carrying out the present invention;

Fig. 13 is a bottom plan view of the body-member of Fig. 12;

Fig. 14 is a perspective view of an expanding-member suitable for use in conjunction with the body-member of Figs. 12 and 13;

Fig. 15 is a side elevation partly in central-longitudinal section of an assembly comprising the body-member of Figs. 12 and 13 and the expanding-member of Fig. 14, with the locking-arms of the said body-member deflected inwardly;

Fig. 16 is a bottom plan view of the structure of Fig. 15;

Fig. 17 is a transverse sectional view taken on the line 17—17 of Fig. 15; and

Fig. 18 is a sectional view similar to Fig. 17 but illustrating still another form of body-member and expanding-member, suitable for carrying out the present invention.

The insert of Figs. 1 to 11 inclusive

The particular insert illustrated in Figs. 1 to 11 inclusive of the accompanying drawings for purposes of making clear a preferred mode of carrying out the present invention, includes a tubular body-member generally designated by the reference character 10 and a plate-like expanding-member generally designated by the reference character 11 and adapted to fit within the said body-member 10 in a manner as will more fully hereinafter appear.

For purposes of convenience of description, the body-member 10 may be said to have an inner end 12 and an outer end 13 respectively adapted to be directed toward the inner and outer ends of a recess in an article in which it is desired to mount the insert of the present invention.

Intersecting the inner end 12 of the body-member 10 are four (more or less) longitudinal slots 14. The formation of the slots 14 serves to divide the inner end of the body-member 10 into a corresponding number of parts, each of which may be aptly termed a "locking-arm" and designated by the reference character 15.

Integral with and projecting outwardly from the inner end of each of the locking-arms 14 is one of four similar flange-like locking-fingers 16, each of which has a locking-face 17 facing generally toward the outer end 13 of the body-member and extending substantially perpendicularly with respect to the longitudinal axis of the said body-member. The inner face of each of the locking-fingers 16 is preferably chamfered as at 18.

In its interior, the tubular body-member 10 is formed with threads 19 extending from the outer end 13 to a point closely approaching the inner end 12 but falling short thereof to provide the interior of the body-member with a plain cylindrical surface 20.

The expanding-member 11 before referred to is of plate-like form in the instance shown and has a substantially-cylindrical periphery save for the formation of a plurality of retaining-fingers or projections 21 preferably corresponding in number to the slots 14 in the body-member 10, and positioned and sized to fit within the said slots for purposes as will hereinafter appear.

The body-member 10 and the expanding-member 11 may be formed of any suitable material, though it may be here mentioned that hard-drawn brass has been found especially well suited for the production of body-members such as 10, while cold-rolled steel has been found satisfactory for the production of expanding-members such as 11.

As initially produced, the body-member 10 is in the form illustrated in Figs. 1 to 3 inclusive wherein the cylindrically-contoured outer surfaces of its locking-arms 15 form a straight continuation of the cylindrical outer surface of the outer portion of the body-member, and wherein the locking-fingers 16 or their equivalent project beyond the diameter of the outer portion of the body-member 10.

With the body-member 10 in the condition illustrated in Figs. 1 to 3 inclusive, the expanding-member 11 may be inserted thereinto by registering its retaining-fingers 21 with the open lower ends of the slots 14 and moving the said expanding-member into the said slots until its retaining-fingers engage with the transverse outer walls of the slots 14.

The locking-arms 15 of the body-member 10 may now be bent inwardly to a degree sufficient to retain the expanding-member in assembled relationship and to bring the outer edges of the locking-fingers 16 within or substantially within the boundaries defined by the outer periphery of the outer end of the body-member 10, as illustrated in Figs. 5 to 10 inclusive.

With the expanding-member 11 assembled with the body-member 10 as above described, the complete insert may be set into a recess 22 in an article 23 of any desired form and composition, as long as it is deformable to the slight degree required by the locking-fingers 16 or their equivalent. The recess 22 in the instance shown in Figs. 10 and 11, has a bottom wall 24 though the said recess may be in the form of a bottomless passage, as is indicated by the broken lines 25 in Fig. 10.

After the assembled insert has been installed in the recess 22, as shown in Fig. 10, a suitable rod or punch may be inserted through the outer end of the body-member 10 into engagement with the outer face of the expanding-member 11 and the said expanding-member may be forced toward the inner end 12 of the body-member 10 into substantially the position in which it is shown in Fig. 11, to thereby outwardly bend the locking-arms 15 and firmly seat their respective locking-fingers 16 into the material forming the wall of the recess 22 or its equivalent, all as indicated in Fig. 11.

The insert will now be so firmly locked in the article 23 as to defy relatively great forces tending to either move it axially or to effect its rotation, since the expanding-member 11 will serve to retain the locking-fingers 16 in their outwardly-projecting positions, as shown in Fig. 11.

By so constructing the body-member 10 that it requires an expanding-member having a thickness but a minor fractional-part (less than one-half) of the axial length of the said body-member in order to outwardly bend its locking-arms, a major and adequate length of thread 19 is left available for engagement by a screw or stud where desired.

Instead of using a rod or punch to force the expanding-member 11 toward the inner end of the body-member 10, obviously a suitable screw may be threaded into the said body-member to effect the same result.

During the movement of the expanding-member 11 or its equivalent toward the inner end of the body-member 10 to effect the outward movement of the locking-arms 15, the riding of the retaining-fingers 21 of the said expanding-member against the opposite surfaces of the slots 14 will serve to effect a large share of outwardly-bending the locking-arms 15 and thus guard the threads 19 against appreciable damage.

*The insert of Figs. 12 to 17 inclusive*

The insert of Figs. 12 to 17 inclusive includes a body-member generally designated by the reference character 26 and having tubular form like the body-member 10 of the preceding figures. The said body-member has an inner end 27 and an outer end 28.

The body-member 26 is provided in its inner portion with four (more or less) longitudinal slots 29, intersecting the inner end 27 and extending substantially half way toward the outer end 28 of the said body-member. The formation of the slots 29 results in providing the inner portion of the body-member with an equal number of locking-arms 30, each of which is provided adjacent its inner end with an annular series of tooth-like locking-projections 31.

Centrally of each of its locking-arms 30 the body-member 26 is formed on its inner periphery with one of four similar longitudinal grooves 32, extending from end to end of the said body-member but preferably having the wall portion at its outer end 28 slightly deflected inwardly to overhang the said groove and provide a stop-abutment 33, as is shown in Figs. 12, 13 and 15, for purposes as will hereinafter appear.

Adapted to be introduced into the body-member 26 while the same is in the condition illustrated in Figs. 12 and 13, is a plate-like expanding-member 34 having four outwardly-projecting fingers 35, each of which is adapted to register with and ride in one of the longitudinal grooves 32 in the body-member 26.

After an expanding-member such as 34 is inserted into the inner end of the body-member 26, the locking-arms 30 may be bent inwardly, as shown in Figs. 15 and 16, to guard against the escape of the expanding-member 34 out of the inner end of the body-member 26 and to bring the locking-projections 31 or their equivalent within the boundaries defined by the outer periphery of the outer portion of the body-member 26, to thereby permit the convenient introduction of the assembly into a recess. The stop-abutments 33 at the outer end of each of the longitudinal grooves 32 will prevent the accidental escape of the expanding member 34 through the outer end of the body-member 26.

After the assembly is made, as illustrated in Figs. 15 to 17 inclusive, the said assembly may be inserted into a suitable recess and when the expanding-member 34 is forced toward the inner end 27 of the said body-member it will, through the intermediary of its fingers 35, cause the locking-arms 30 or their equivalent to bend outwardly, to thereby engage the locking-projections 31 or their equivalent with the wall of the recess in which the assembly may be mounted.

By providing an expanding-member such as 34 which has a thickness in the direction of the length of the body-member 10 of but a minor fraction of the said length, the internal threads 36 within the said body-member are rendered available for engagement by a screw or the like throughout substantially their entire length, after the said expanding-member has been depressed to a position adjacent the inner end 27 of the body-member 26.

The insert of Fig. 18

Fig. 18 is a transverse sectional view similar to Fig. 17 except that it illustrates a slightly modified form of insert as compared to the form illustrated in Figs. 12 to 17 inclusive.

The insert indicated in Fig. 18 includes a tubular body-member 37 which corresponds to the body-member 26 before described save that it is provided with only two slots 38—38, rather than the four slots 29 previously described. The formation of the two slots 38—38 serves to divide the inner portion of the body-member 37 into but two locking-arms 39—39, each of which is of substantially semi-circular form in cross section, as is apparent from Fig. 18.

Formed in the interior of the tubular body-member 37 are two longitudinal grooves 40—40 corresponding to the longitudinal grooves 32 before described, and one of which is located substantially centrally with respect to each of the locking-arms 39—39.

Engaging respectively with the longitudinal grooves 40—40 in the body-member 37, are two fingers or projections 41—41 formed integral with and respectively projecting outwardly at diametrically opposite points from a disk-like expanding-member 42.

The expanding-member 42 above described preferably has a thickness similar to the thickness of the expanding-member 34 above described and will serve to outwardly spring the locking-arms 39—39 in a manner similar to that described in connection with the functioning of the expanding-member 34.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An expansible insert including in combination: a tubular body-member having a circumferentially-continuous outer end provided with internal screw threads, and a leading end, said leading end having a plurality of circumferentially-spaced guide-apertures extending longitudinally thereof, stop-abutments at the outer extremities of said guide-apertures and a plurality of outwardly-bendable locking-arms, the fixed ends of which are integral with the said circumferentially-continuous outer end of said tubular body-member, each locking-arm having screw threads on its inner surface and locking-means on its outer surface, said locking-means being constructed and arranged to engage with the wall of an insert-accommodating recess, each of said plurality of locking-arms being bent normally laterally inwardly toward the leading end and the longitudinal axis of said body-member whereby the locking-means of said arms lie within a circumference less than the circumference of said body-member and the leading ends of said longitudinal guide-apertures converge; and an expanding-member freely mounted within said body and of less over-all transverse dimensions than the minor internal diameter of the threaded portion of said body so as to avoid damage to the threads when said member is moved relative thereto, said member having a plurality of integral radially-projecting lugs arranged normally to movably engage in said longitudinal circumferentially-spaced guide-apertures respectively, said lugs being held in assembled position therein by confinement between said stop-abutments and the converging leading ends of said guide-apertures and arranged to engage respectively with said integral locking-arms to bend the same outwardly when the radially-projecting lugs of said expanding-member are moved in said longitudinal guide-apertures toward the leading end of said body-member to thus bend the locking-arms outwardly and force said locking-means into locking engagement with the wall of said insert-accommodating recess, the said expanding-member having a thickness in the direction of the length of said body-member, which thickness is but a minor fraction of the said length to thus leave the threads which are within the outer end of the body-member and on the inner surfaces of said locking-arms free for engagement by a screw or the like when the said expanding-member is forced into the leading end of said body-member.

2. An expansible insert, including in combination: a tubular body-member provided in its outer end with internal threads and provided at its leading end with a plurality of integral outwardly-bendable locking-arms each having locking-means on its outer surface constructed and arranged to engage with the wall of an insert-accommodating recess, each of the said plurality of integral locking-arms being provided in its inner face with one of a plurality of substantially-longitudinal recessed guide grooves; and an expanding-member mounted within the said tubular body-member and provided with a plurality of radially-projecting fingers respectively engageable in the recessed guide grooves in the said locking-arms to hold said expanding-member in spaced relationship to the inner faces of the integral locking-arms and to bend the said locking-arms outwardly when the expanding-member is moved toward the leading end of the body-member to thus force the locking-means of the said locking-arms into locking engagement with the wall of said insert-accommodating recess, the said expanding-member having a thickness in the direction of the length of the said body-member which thickness is but a minor fraction of the said length to thus leave the threads within the outer end of the body-member free for engagement by a screw or the like when the said expanding-member is forced into the leading end of the said body-member.

3. An expansible insert, including in combination: a tubular body-member provided in its outer end with internal threads and provided at its leading end with a plurality of integral outwardly-bendable locking-arms each having screw threads on its inner surface and locking-means on its outer surface constructed and arranged to engage with the wall of an insert-accommodating recess, the inner face of each locking-arm being formed with a substantially-longitudinal groove; and expanding-member mounted within the tubular body-member and provided with outwardly-extending projections engageable respectively with the grooves in the inner surfaces of the said integral locking-arms to bend the said locking-arms outwardly when the expanding-member is moved toward the leading end of the body-member to thus force the locking-means of the said locking-arms into locking engagement with the wall of said insert-accommodating recess, the said expanding-member having a thickness in the direction of the length of the said body-member which thickness is but a minor fraction of the said length to thus leave the threads which are within the outer end of the body-member and on the inner surfaces of said locking-arms free for engagement by a screw or the like when the said expanding-member is forced into the leading end of the said body-member; and means normally holding the said expanding-member in a position intermediate the respective opposite ends of the said body-member in readiness to outwardly bend the said locking-arms.

4. An expansible insert for insertion in the recess of a relatively-soft supporting medium comprising a tubular body threaded interiorly throughout substantially its entire length and provided adjacent its leading-end with a plurality of substantially-longitudinal slots spaced apart about the circumference of said body, said slots being closed adjacent the outer end of said body and open at the leading-end thereof, the said body being thus provided adjacent its leading-end with a plurality of integral locking-arms each of said locking-arms being bendable laterally and having locking-means on its leading-end constructed and arranged to engage with the walls of said recess, said arms being normally bent laterally inwardly toward the longitudinal axis of said body to provide substantially-inwardly converging interior and exterior surfaces adjacent the leading-end of said body-member whereby said locking-means lie within a circumference less than the circumference of said body, and to close up the lower ends of said longitudinal slots so as to provide said slots with longitudinally-converging walls; and an expanding-member comprising a relatively-thin rigid element freely mounted within said body and of less over-all transverse dimensions than the minor internal diameter of the threaded portion of said body so as to avoid damage to said threads when said element is moved relative thereto, said rigid element having a plurality of integral radially-projecting lugs arranged normally to movably engage in said longitudinal slots respectively, and to be held in assembled position therein adjacent the closed ends thereof by said converging walls, said lugs being adapted to cammingly engage the converging walls of said slots as said rigid element is moved toward the conical internally-threaded leading-end of said body-member to spread apart said arms from their normal inwardly-bent positions so as to prevent damage to said threads and drive the said locking-means of said arms into the adjacent walls of said recess.

5. An expansible insert for insertion in the recess of a relatively-soft supporting medium comprising a tubular body threaded interiorly throughout substantially its entire length and provided adjacent its leading-end with a plurality of substantially-longitudinal slots spaced apart about the circumference of said body, said slots being closed adjacent the outer end of said body and open at the leading-end thereof, the said body being thus provided adjacent its leading-end with a plurality of integral laterally-bendable locking-arms each of said locking-arms having screw threads on its inner wall and locking-means on its outer wall constructed and arranged to engage with the wall of said recess, said arms being normally bent laterally inwardly toward the longitudinal axis of said body to provide substantially-inwardly converging interior and exterior surfaces adjacent the leading-end of said body-member whereby said locking-means lie within a circumference less than the circumference of said body, and to close up the lower ends of said longitudinal slots so as to provide said slots with longitudinally-converging walls; and an expanding-member comprising a relatively-thin rigid element freely mounted within said body and of less over-all transverse dimensions than the minor internal diameter of the threaded portions of said body and said locking-arms so as to avoid damage to said threads when said element is moved relative thereto, said rigid element having a plurality of integral radially-projecting lugs arranged normally to movably engage in said longitudinal slots respectively, and to be held in assembled position therein adjacent the closed ends thereof by said converging walls, said lugs being adapted to cammingly engage the converging walls of said slots as said rigid element is moved toward the conical internally-threaded leading-end of said body-member to spread apart said locking-arms from their normal inwardly-bent positions so as to prevent damage to the threads of said locking-arms and drive the said locking-means of said arms into the adjacent walls of said recess, the thickness of said thin expander-element being such as to leave the entire length of the internally-threaded portion of the said body and a major portion of the screw threads of said locking-arms uncovered for engagement by a screw when the said thin expander-element is forced into its final position in the leading-end of said body.

EMIL K. UHLE.

REFERENCES CITED

The following references are of record in the file of this patent:

UNITED STATES PATENTS

| Number | Name | Date |
|---|---|---|
| 322,657 | Tolman | July 21, 1885 |
| 841,338 | Palmer | Jan. 15, 1907 |
| 1,264,230 | Vierus | Apr. 30, 1918 |
| 2,379,786 | Bugg | July 3, 1945 |

FOREIGN PATENTS

| Number | Country | Date |
|---|---|---|
| 100,164 | Austria | Feb. 4, 1937 |
| 169,273 | Switzerland | Aug. 1, 1934 |
| 463,414 | Great Britain | Mar. 30, 1937 |